US010042532B2

(12) United States Patent
Matas et al.

(10) Patent No.: US 10,042,532 B2
(45) Date of Patent: Aug. 7, 2018

(54) METHODS AND SYSTEMS FOR VIEWING EMBEDDED CONTENT

(71) Applicant: Facebook, Inc., Menlo Park, CA (US)

(72) Inventors: Michael James Matas, Healdsburg, CA (US); Benjamin S. Langholz, San Francisco, CA (US); Brian Daniel Amerige, Palo Alto, CA (US)

(73) Assignee: FACEBOOK, INC., Menlo Park, CA (US)

(*) Notice: Subject to any disclaimer, the term of this patent is extended or adjusted under 35 U.S.C. 154(b) by 410 days.

(21) Appl. No.: 14/704,472

(22) Filed: May 5, 2015

(65) Prior Publication Data
US 2016/0328125 A1 Nov. 10, 2016

(51) Int. Cl.
G06F 3/0484 (2013.01)
G06F 3/0488 (2013.01)
(Continued)

(52) U.S. Cl.
CPC ........ G06F 3/04845 (2013.01); G06F 1/1694 (2013.01); G06F 3/0346 (2013.01);
(Continued)

(58) Field of Classification Search
CPC ............... G06F 3/04845; G06F 3/0346; G06F 3/04815; G06F 3/04842; G06F 3/0485;
(Continued)

(56) References Cited

U.S. PATENT DOCUMENTS 8,619,083 B2 * 12/2013 Nickolov .................. G06T 3/40
345/428
9,063,640 B2 6/2015 Hoffert et al.
(Continued)

FOREIGN PATENT DOCUMENTS

KR 20140074888 A 6/2014
WO WO0179980 A1 10/2001

OTHER PUBLICATIONS

Facebook, Inc., Extended European Search Report, EP16150658.9, dated Feb. 23, 2016, 8 pgs.
(Continued)

Primary Examiner — Abdullah Al Kawsar
Assistant Examiner — Jeremy L Stanley
(74) Attorney, Agent, or Firm — Morgan, Lewis & Bockius LLP

(57) ABSTRACT

An item of content includes an embedded content item and one or more portions distinct from the embedded content item. An electronic device simultaneously displays the embedded content item and a first portion of the item of content distinct from the embedded content item in a display area having a display height and a display width. The embedded content item is displayed at a first resolution at which its entire width is contained within the display width of the display area. In response to a first user input indicating selection of the embedded content item, display of the first portion of the item of content ceases, and a first portion of the embedded content item is displayed at a second resolution that is greater than the first resolution, wherein a height of the first portion of the embedded content item at the second resolution equals the display height.

13 Claims, 11 Drawing Sheets

(51) Int. Cl.
*G06F 3/0485* (2013.01)
*G06F 3/0346* (2013.01)
*G06F 1/16* (2006.01)
*G06F 3/0481* (2013.01)
*G06F 17/21* (2006.01)
*G09G 5/391* (2006.01)

(52) U.S. Cl.
CPC ........ *G06F 3/0485* (2013.01); *G06F 3/04815* (2013.01); *G06F 3/04842* (2013.01); *G06F 3/04883* (2013.01); *G06F 17/217* (2013.01); *G09G 5/391* (2013.01); *G06F 2203/04806* (2013.01)

(58) Field of Classification Search
CPC .. G06F 3/04883; G06F 1/1694; G06F 17/217; G06F 2203/04806; G09G 5/391
See application file for complete search history.

(56) References Cited

U.S. PATENT DOCUMENTS

| | | | | |
|---|---|---|---|---|
| 9,218,188 | B2* | 12/2015 | Matas | G06F 9/4443 |
| 9,245,312 | B2* | 1/2016 | Matas | G06T 3/0006 |
| 2004/0025112 | A1 | 2/2004 | Chasen et al. | |
| 2005/0097458 | A1 | 5/2005 | Wilson | |
| 2006/0156254 | A1* | 7/2006 | Satake | G09G 5/00 |
| | | | | 715/838 |
| 2009/0201313 | A1 | 8/2009 | Thorn | |
| 2010/0299641 | A1 | 11/2010 | Cundill | |
| 2011/0057880 | A1* | 3/2011 | Kasahara | G06F 1/1626 |
| | | | | 345/158 |
| 2011/0163971 | A1 | 7/2011 | Wagner | |
| 2011/0271227 | A1* | 11/2011 | Takahashi | G06F 3/0481 |
| | | | | 715/800 |
| 2013/0106888 | A1 | 5/2013 | Penner et al. | |
| 2013/0111395 | A1 | 5/2013 | Ying | |
| 2013/0145267 | A1 | 6/2013 | Ramachandran | |
| 2013/0198641 | A1* | 8/2013 | Brownlow | G06F 3/0485 |
| | | | | 715/738 |
| 2013/0198661 | A1* | 8/2013 | Matas | G06F 3/048 |
| | | | | 715/762 |
| 2013/0227494 | A1 | 8/2013 | Matas | |
| 2013/0326398 | A1* | 12/2013 | Zuverink | G06F 3/048 |
| | | | | 715/784 |
| 2014/0059457 | A1 | 2/2014 | Min | |
| 2014/0095328 | A1* | 4/2014 | Forouzandeh | G06Q 30/0277 |
| | | | | 705/14.73 |
| 2014/0123021 | A1* | 5/2014 | Walkin | G06F 9/4443 |
| | | | | 715/746 |
| 2014/0149940 | A1* | 5/2014 | Li | G06F 3/04842 |
| | | | | 715/838 |
| 2014/0223292 | A1* | 8/2014 | Sakuta | G06F 3/048 |
| | | | | 715/252 |
| 2014/0270684 | A1 | 9/2014 | Jayaram et al. | |
| 2015/0015789 | A1 | 1/2015 | Guntur et al. | |
| 2015/0062178 | A1 | 3/2015 | Matas et al. | |
| 2015/0309701 | A1* | 10/2015 | Jatzold | G06F 3/0484 |
| | | | | 715/765 |
| 2016/0041737 | A1* | 2/2016 | Castello | G06F 3/0484 |
| | | | | 715/800 |
| 2016/0093023 | A1* | 3/2016 | Prasad | G06K 9/3241 |
| | | | | 382/173 |

OTHER PUBLICATIONS

Facebook, Inc., International Search Report and Written Opinion, PCT/US2015/030204, dated Feb. 3, 2016, 11 pgs.
Facebook, Inc., Communication Pursuant Rule 70a(1), EP16150658.9, dated Nov. 14, 2016, 2 pgs.
Facebook, Inc., International Preliminary Report on Patentability, PCT/US2015/030204, dated Nov. 7, 2017, 7 pgs.
Facebook, Inc., Communication Pursuant Article 94(3), EP16150658.9, dated Jul. 3, 2017, 6 pgs.
Facebook, Inc., Registration Certificate, CA2,984,880, Dec. 6, 2017, 1 pg.
Reckhow, Office Action, U.S. Appl. No. 14/708,080, dated Aug. 28, 2017, 56 pgs.

* cited by examiner

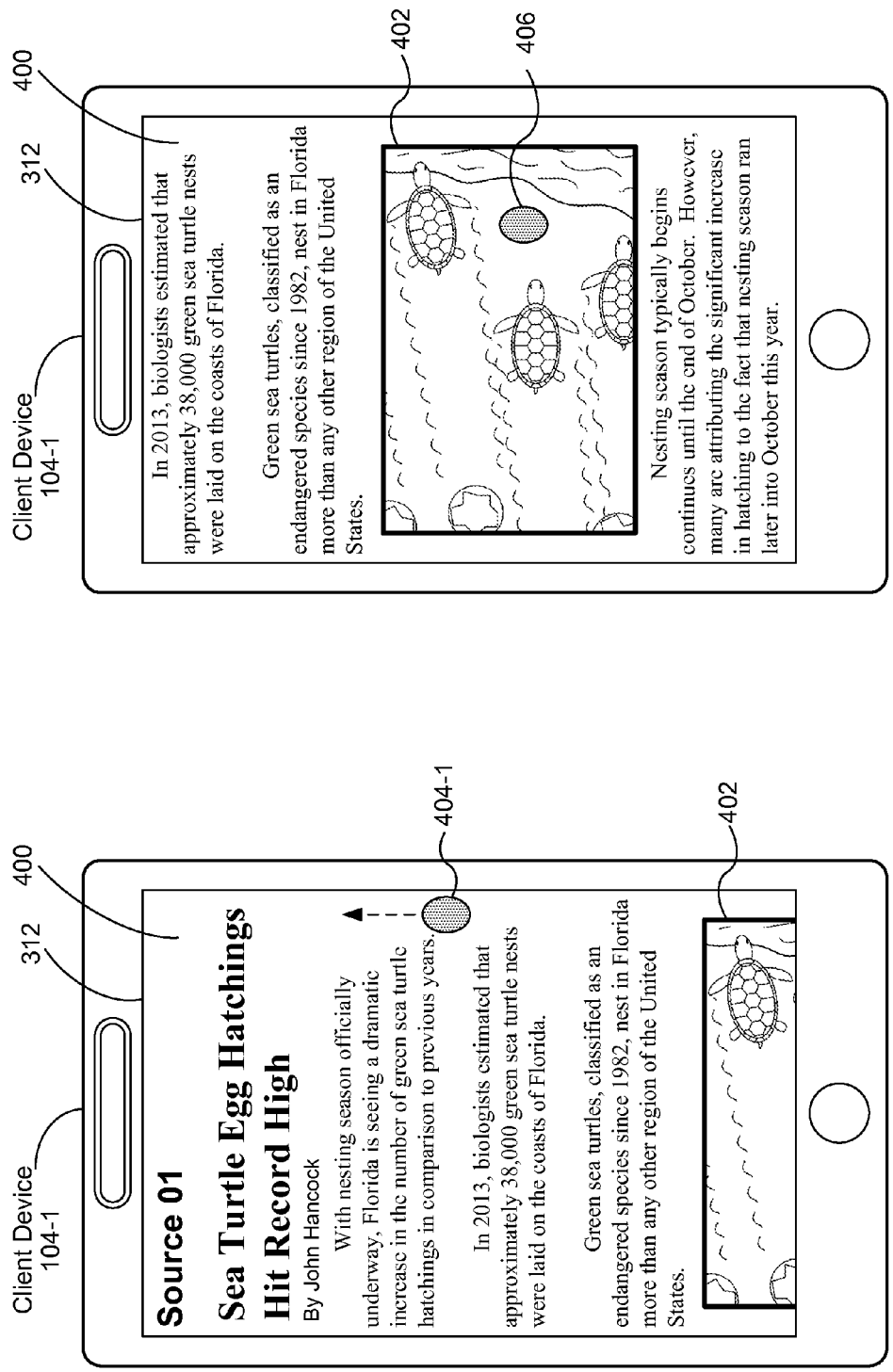

METHODS AND SYSTEMS FOR VIEWING EMBEDDED CONTENT

TECHNICAL FIELD

This relates generally to viewing embedded content in an item of content, including but not limited to using gestures to view embedded content.

BACKGROUND

The Internet has become an increasingly dominant platform for the publication of electronic content, for both the media and the general population. Electronic content takes on many forms, some with which a consumer can interact, such as embedded pictures or videos a consumer may view and manipulate. The embedded pictures or videos are embedded, for example, in digital items of content.

As the use of mobile devices for digesting electronic content becomes more prevalent, consumers often struggle to view and interact with embedded electronic content in an efficient and effective manner.

SUMMARY

Accordingly, there is a need for methods, systems, and interfaces for viewing embedded content in a simple and efficient manner. By utilizing gestures to view various portions of embedded content at various resolutions, users can efficiently and easily digest electronic content. Such methods and interfaces optionally complement or replace conventional methods for viewing embedded content.

In accordance with some embodiments, a method is performed at an electronic device (e.g., a client device) with one or more processors and memory storing instructions for execution by the one or more processors. The method includes simultaneously displaying, within an item of content, an embedded content item and a first portion of the item of content distinct from the embedded content item in a display area having a display height and a display width. The embedded content item is displayed at a first resolution at which the entire width of the embedded content item is contained within the display width of the display area. A first user input is detected, indicating selection of the embedded content item. In response to the first user input, display of the first portion of the item of content ceases, and a first portion of the embedded content item is displayed at a second resolution that is greater than the first resolution, wherein a height of the first portion of the embedded content item at the second resolution equals the display height.

In accordance with some embodiments, an electronic device (e.g., a client device) includes one or more processors, memory, and one or more programs; the one or more programs are stored in the memory and configured to be executed by the one or more processors. The one or more programs include instructions for performing the operations of the method described above. In accordance with some embodiments, a non-transitory computer-readable storage medium has stored therein instructions that, when executed by the electronic device, cause the electronic device to perform the operations of the method described above.

Thus, electronic devices are provided with more effective and efficient methods for viewing embedded content, thereby increasing the effectiveness and efficiency of such devices and user satisfaction with such devices.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIGS. 4A-4G illustrate exemplary graphical user interfaces (GUIs) on a client device for viewing embedded content, in accordance with some embodiments.

DESCRIPTION OF EMBODIMENTS

Figure 1:
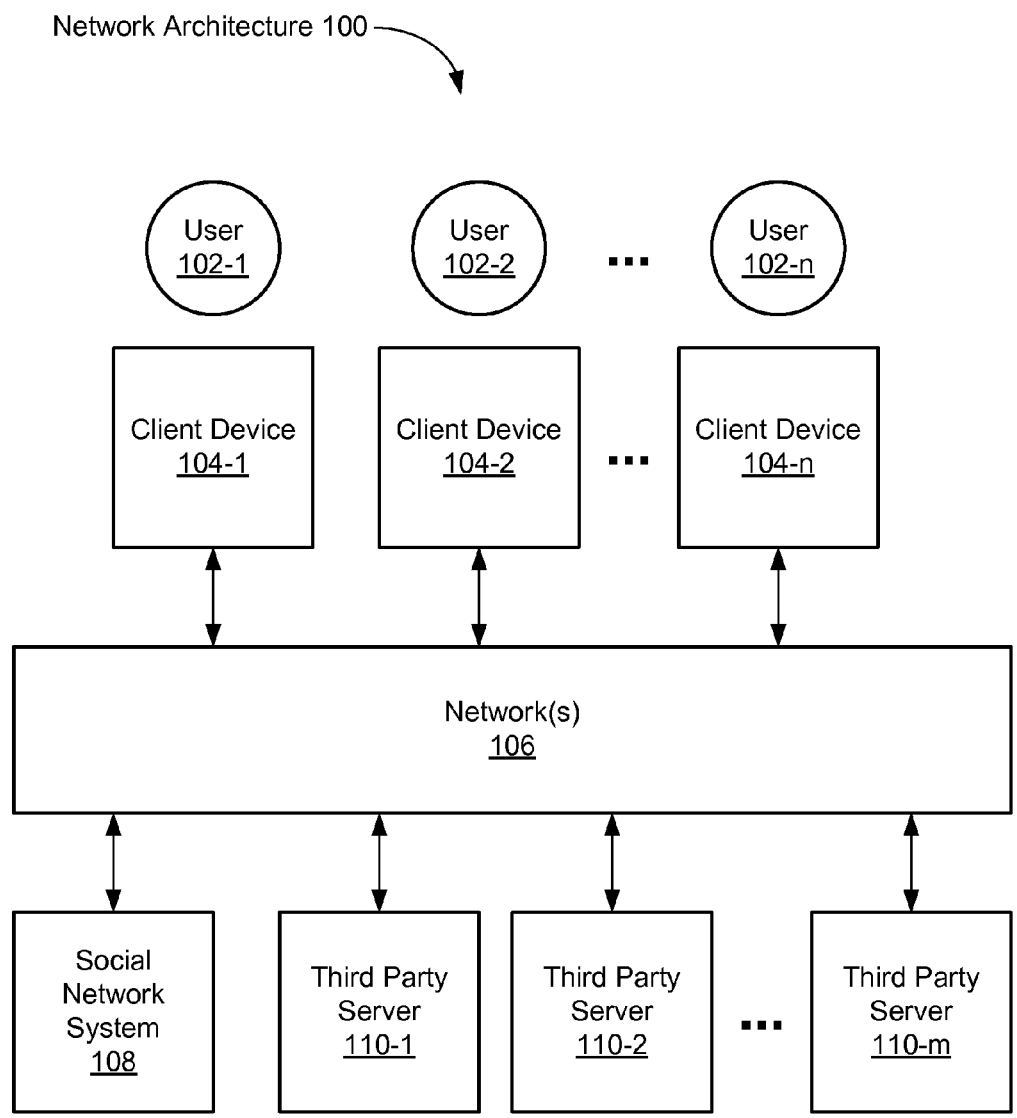
FIG. 1 is a block diagram illustrating an exemplary network architecture of a social network in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first portion of an item of content could be termed a second portion of the item of content, and, similarly, a second portion of the item of content could be termed a first portion of the item of content, without departing from the scope of the various described embodiments. The first portion of the item of content and the second portion of the item of content are both portions of the item of content, but they are not the same portion.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

FIG. 1 is a block diagram illustrating an exemplary network architecture 100 of a social network in accordance with some embodiments. The network architecture 100 includes a number of client devices (also called "client systems," "client computers," or "clients") 104-1, 104-2, . . . 104-n communicably connected to an electronic social-network system 108 by one or more networks 106 (e.g., the Internet, cellular telephone networks, mobile data networks, other wide area networks, local area networks, metropolitan area networks, and so on). In some embodiments, the one or more networks 106 include a public communication network (e.g., the Internet and/or a cellular data network), a private communications network (e.g., a private LAN or leased lines), or a combination of such communication networks.

In some embodiments, the client devices 104-1, 104-2, . . . 104-n are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the social-network system 108. In some embodiments, the social-network system 108 is a single computing device such as a computer server, while in other embodiments, the social-network system 108 is implemented by multiple computing devices working together to perform the actions of a server system (e.g., cloud computing).

Users 102-1, 102-2, . . . 102-n employ the client devices 104-1, 104-2, . . . 104-n to access the social-network system 108 and to participate in a corresponding social-networking service provided by the social-network system 108. For example, one or more of the client devices 104-1, 104-2, . . . 104-n execute web browser applications that can be used to access the social-networking service. As another example, one or more of the client devices 104-1, 104-2, . . . 104-n execute software applications that are specific to the social-networking service (e.g., social-networking "apps" running on smart phones or tablets, such as a Facebook social-networking application running on an iPhone, Android, or Windows smart phone or tablet).

Users interacting with the client devices 104-1, 104-2, . . . 104-n can participate in the social-networking service provided by the social-network system 108 by posting information (e.g., items of content), such as text comments (e.g., updates, announcements, replies), digital photos, videos, audio files, links, and/or other electronic content. Users of the social-networking service can also annotate information (e.g., items of content) posted by other users of the social-networking service (e.g., endorsing or "liking" a posting of another user, or commenting on a posting by another user). In some embodiments, information can be posted on a user's behalf by systems and/or services external to the social-network system 108. For example, the user may post a review of a movie to a movie-review website, and with proper permissions that website may cross-post the review to the social network system 108 on the user's behalf. In another example, a software application executing on a mobile client device, with proper permissions, may use global positioning system (GPS) or other geo-location capabilities (e.g., Wi-Fi or hybrid positioning systems) to determine the user's location and update the social network system 108 with the user's location (e.g., "At Home", "At Work", or "In San Francisco, Calif."), and/or update the social network system 108 with information derived from and/or based on the user's location. Users interacting with the client devices 104-1, 104-2, . . . 104-n can also use the social-networking service provided by the social-network system 108 to define groups of users. Users interacting with the client devices 104-1, 104-2, . . . 104-n can also use the social-networking service provided by the social-network system 108 to communicate and collaborate with each other.

In some embodiments, the network architecture 100 also includes third-party servers 110-1, 110-2, . . . 110-m. In some embodiments, a given third-party server 110 is used to host third-party websites that provide web pages to client devices 104, either directly or in conjunction with the social-network system 108. In some embodiments, the social-network system 108 uses inline frames ("iframes") to nest independent websites within a user's social network session. In some embodiments, a given third-party server is used to host third-party applications that are used by client devices 104, either directly or in conjunction with the social-network system 108. In some embodiments, the social-network system 108 uses iframes to enable third-party developers to create applications that are hosted separately by a third-party server 110, but operate within a social-networking session of a user 102 and are accessed through the user's profile in the social-network system 108. Exemplary third-party applications include applications for books, business, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, a given third-party server 110 is used to host enterprise systems, which are used by client devices 104, either directly or in conjunction with the social-network system 108. In some embodiments, a given third-party server 110 is used to provide third-party content, such as items of content (e.g., news articles, reviews, message feeds, etc.). Items of content may include embedded content items (e.g., text, photos, videos, audio, and/or other electronic content with which a user may interact, such as interactive maps, games, etc.).

In some embodiments, a given third-party server 110 is a single computing device, while in other embodiments, a given third-party server 110 is implemented by multiple computing devices working together to perform the actions of a server system (e.g., cloud computing).

Figure 2:
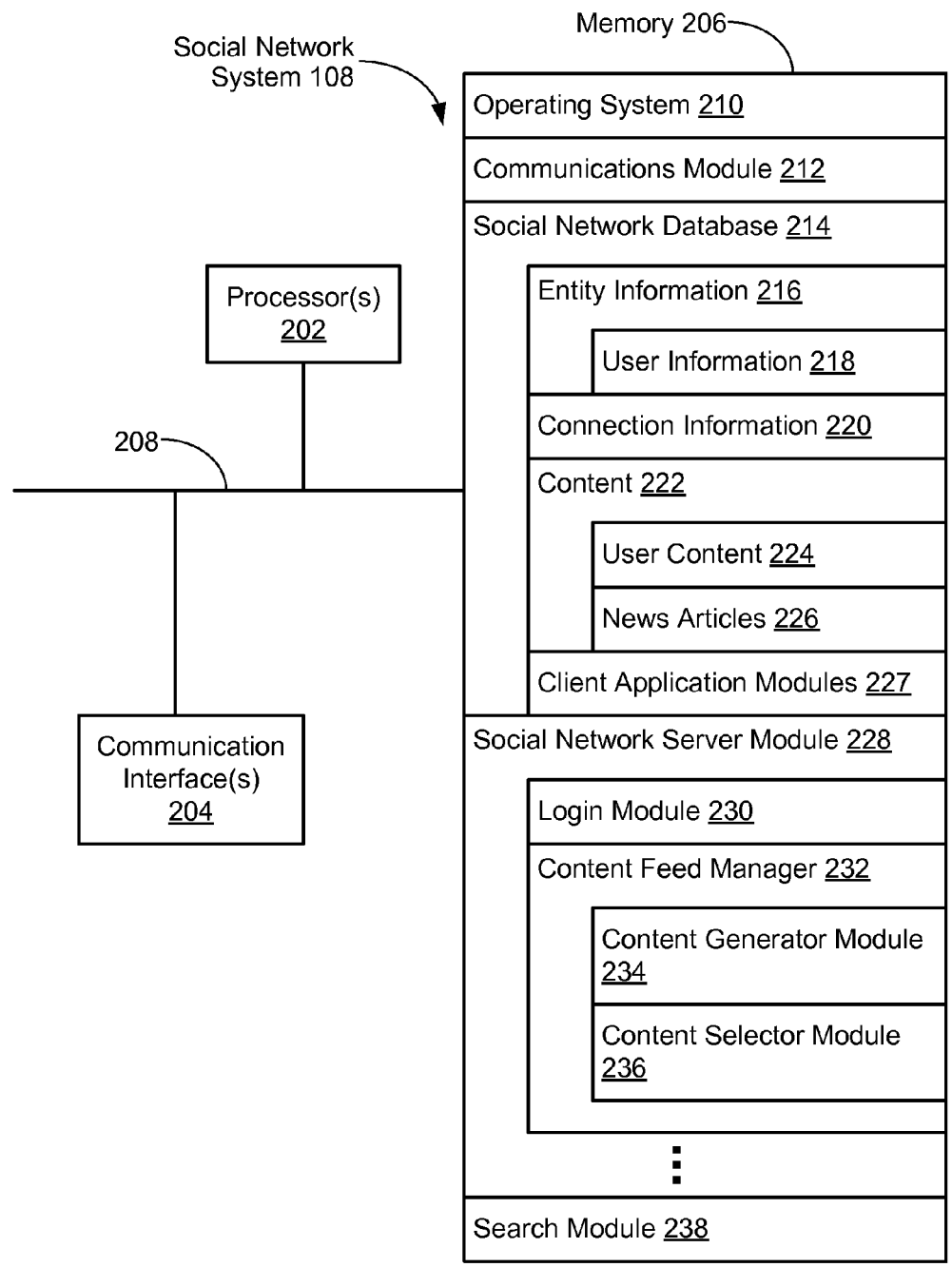
FIG. 2 is a block diagram illustrating an exemplary social-network system in accordance with some embodiments.

FIG. 2 is a block diagram illustrating an exemplary social-network system 108 in accordance with some embodiments. The social-network system 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social-network system 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Figure 3:
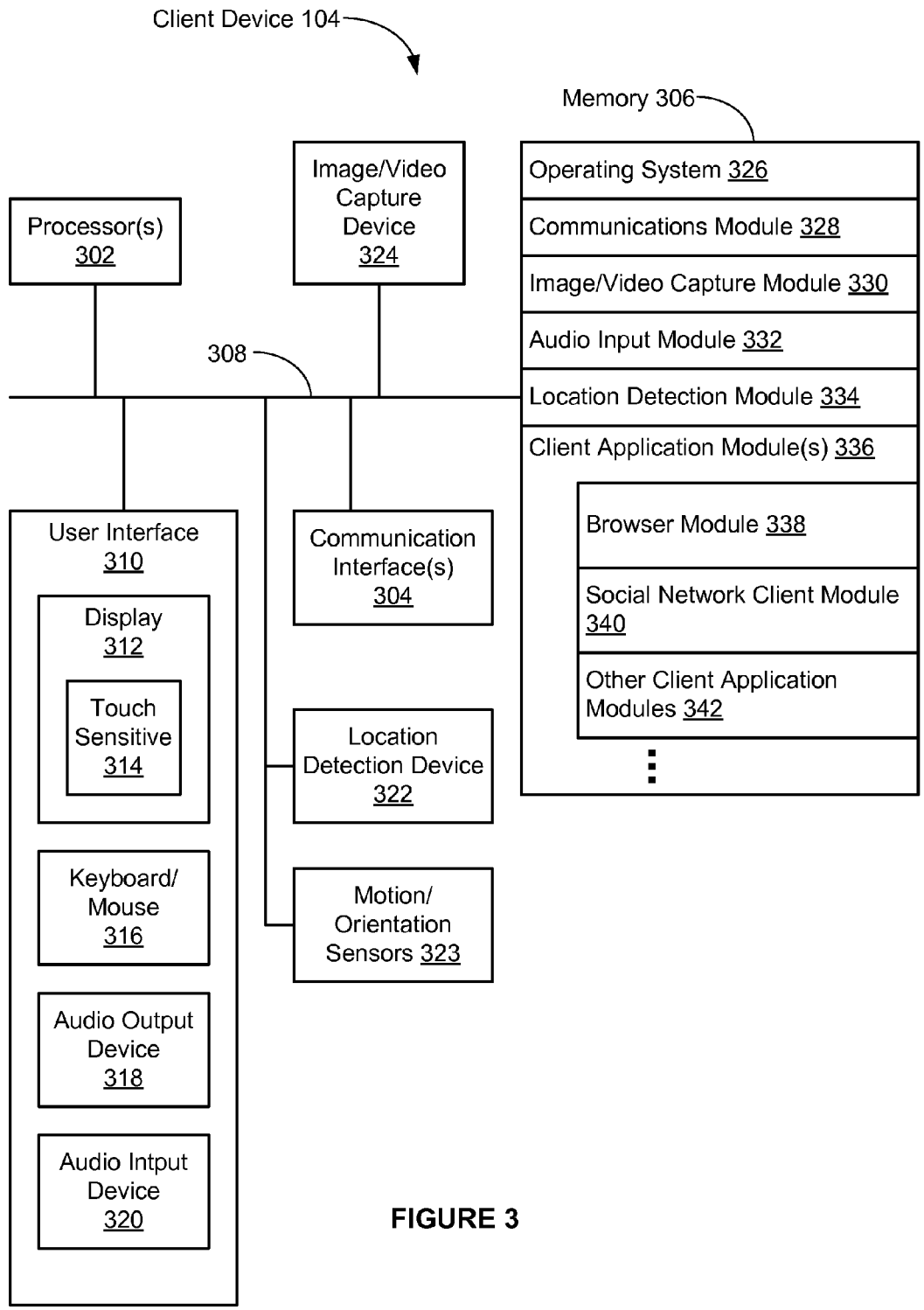
FIG. 3 is a block diagram illustrating an exemplary client device in accordance with some embodiments.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the social-network system 108 to other computers via the one or more communication network interfaces 204 (wired or wireless) and one or more communication networks (e.g., the one or more networks 106)
- a social network database 214 for storing data associated with the social network, such as:
  entity information 216, such as user information 218; connection information 220; and
  content 222, such as user content 224 (e.g., items of content with embedded content items, such as text, photos, videos, audio, and/or other electronic content with which a user may interact, such as interactive maps, games, etc.) and/or news articles 226;
- a social network server module 228 for providing social-networking services and related features (e.g., in conjunction with browser module 338 or social network client module 340 on the client device 104, FIG. 3), which includes:
  - a login module 230 for logging a user 102 at a client 104 into the social-network system 108; and
  - a content feed manager 232 for providing content to be sent to clients 104 for display, which includes:
    - a content generator module 234 for adding objects to the social network database 214, such as images, videos, audio files, comments, status messages, links, applications, and/or other entity information 216, connection information 220, or content 222; and
    - a content selector module 236 for choosing the information/content to be sent to clients 104 for display; and
- a search module 238 for enabling users of the social-network system to search for content and other users in the social network.

The social network database 214 stores data associated with the social network in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social-networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, login information, privacy and other preferences, biographical data, and the like. In some embodiments, for a given user, the user information 218 includes the user's name, profile picture, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social-network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social-network system 108 transmits a "friend request" to the second user. If the second user confirms the "friend request," the social-network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like" or have "attended," "played," "listened," "cooked," "worked at," or "watched" the entity at the other node. The page in the social-networking service that corresponds to the entity at the other node may include, for example, a selectable "like," "check in," or "add to favorites" icon. After the user clicks one of these icons, the social-network system 108 may create a "like" edge, "check in" edge, or a "favorites" edge in response to the corresponding user action. As another example, the user may listen to a particular song using a particular application (e.g., an online music application). In this case, the social-network system 108 may create a "listened" edge and a "used" edge between the user node that corresponds to the user and the entity nodes that correspond to the song and the application, respectively, to indicate that the user listened to the song and used the application. In addition, the social-network system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., games executable within a browser window or frame), podcasts, links, and the like.

In some embodiments, the social network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

FIG. 3 is a block diagram illustrating an exemplary client device 104 in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In some embodiments, the touch-sensitive surface 314 is configured to detect various swipe gestures (e.g., in vertical and/or horizontal directions) and/or other gestures (e.g., single/double tap). In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. The client device 104 also optionally includes an image/video capture device 324, such as a camera or webcam.

In some embodiments, the client device 104 includes one or more optional sensors 323 (e.g., gyroscope, accelerometer) for detecting a motion and/or change in orientation of the client device. In some embodiments, a detected motion and/or orientation of the client device 104 (e.g., the motion/ change in orientation corresponding to a user input produced by a user of the client device) is used to manipulate an interface (or content items within the interface) displayed on the client device 104 (e.g., viewing different portions of a displayed embedded content item, as shown in FIGS. 4D and 4E).

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the social-network system 108;
- an audio input module 332 (e.g., a microphone module) for processing audio captured by the audio input device 320, where the respective audio may be sent or streamed (e.g., by a client application module 336) to the social-network system 108;
- a location detection module 334 (e.g., a GPS, Wi-Fi, or hybrid positioning module) for determining the location of the client device 104 (e.g., using the location detection device 322) and providing this location information for use in various applications (e.g., social network client module 340); and
- one or more client application modules 336, including the following modules (or sets of instructions), or a subset or superset thereof:
  - a web browser module 338 (e.g., Internet Explorer by Microsoft, Firefox by Mozilla, Safari by Apple, or Chrome by Google) for accessing, viewing, and interacting with web sites (e.g., a social-networking web site provided by the social-network system 108 and/or web sites that are linked to in a social network module 340 and/or an optional client application module 342), such as a web site hosting a service for displaying and accessing items of content (e.g., news articles) with embedded content items (e.g., text, photos, videos, audio, and/or other electronic content with which a user may interact)
  - a social network module 340 for providing an interface to a social-networking service (e.g., a social-networking service provided by social-network system 108) and related features, such as an interface to a service for displaying and accessing items of content (e.g., news articles) with embedded content items (e.g., text, photos, videos, audio, and/or other electronic content with which a user may interact); and/or optional client application modules 342, such as applications for displaying and accessing items of content (e.g., news articles) with embedded content items (e.g., text, photos, videos, audio, and/or other electronic content with which a user may interact), word processing, calendaring, mapping, weather, stocks, time keeping, virtual digital assistant, presenting, number crunching (spreadsheets), drawing, instant messaging, e mail, telephony, video conferencing, photo management, video management, a digital music player, a digital video player, 2D gaming, 3D (e.g., virtual reality) gaming, electronic book reader, and/or workout support.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Attention is now directed towards embodiments of graphical user interfaces ("GUIs") and associated processes that may be implemented on a client device (e.g., the client device 104 in FIG. 3).

FIGS. 4A-4G illustrate exemplary GUIs on a client device 104 for viewing items of content that include content items (e.g., pictures, graphics, etc.) embedded within them, in accordance with some embodiments. The GUIs in these figures are displayed in response to detected user inputs, starting from the displayed item of content 400 (FIG. 4A), and are used to illustrate the processes described below, including the method 500 (FIGS. 5A-5C). The GUIs may be provided by a web browser (e.g., web browser module 338, FIG. 3), an application for a social-networking service (e.g., social network module 340), and/or a third-party application (e.g., client application module 342). While FIGS. 4A-4G illustrate examples of GUIs, in other embodiments, a GUI displays user-interface elements in arrangements distinct from the embodiments of FIGS. 4A-4G.

FIGS. 4A and 4B illustrate a GUI for an item of content 400 and embedded content item 402. Items of content include various types of formatted content (e.g., web content, such as HTML-formatted documents, or documents in other proprietary web formats), including but not limited to news articles, web pages, blogs, user content published via a social-networking service, and/or other types of published content. Items of content may include various types of embedded content items presentable to a user and with which a user may interact. Examples of embedded content items include text, digital media (e.g., photos, videos, audio), and/or other electronic content with which a user may interact (e.g., interactive maps, games, etc.). In FIGS. 4A and 4B, the item of content 400 is a news article (titled "Sea Turtle Egg Hatchings Hit Record High") that includes embedded content item 402 (a picture).

Swipe gesture 404-1 in FIG. 4A corresponds to a vertical scroll for viewing and browsing the item of content 400, where the resulting view in FIG. 4B allows the embedded content item 402 to be shown in its entirety.

Figure 4C:
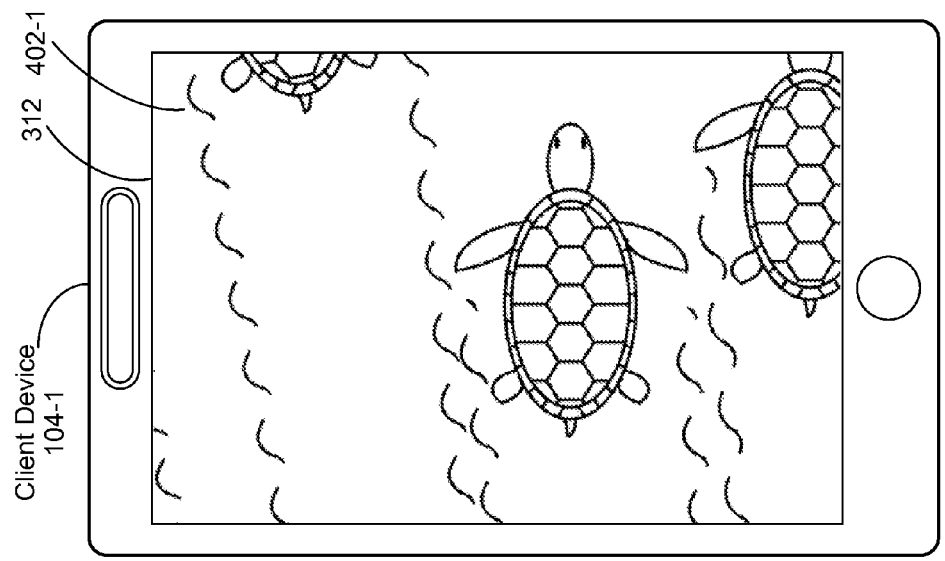
Figure 4C:
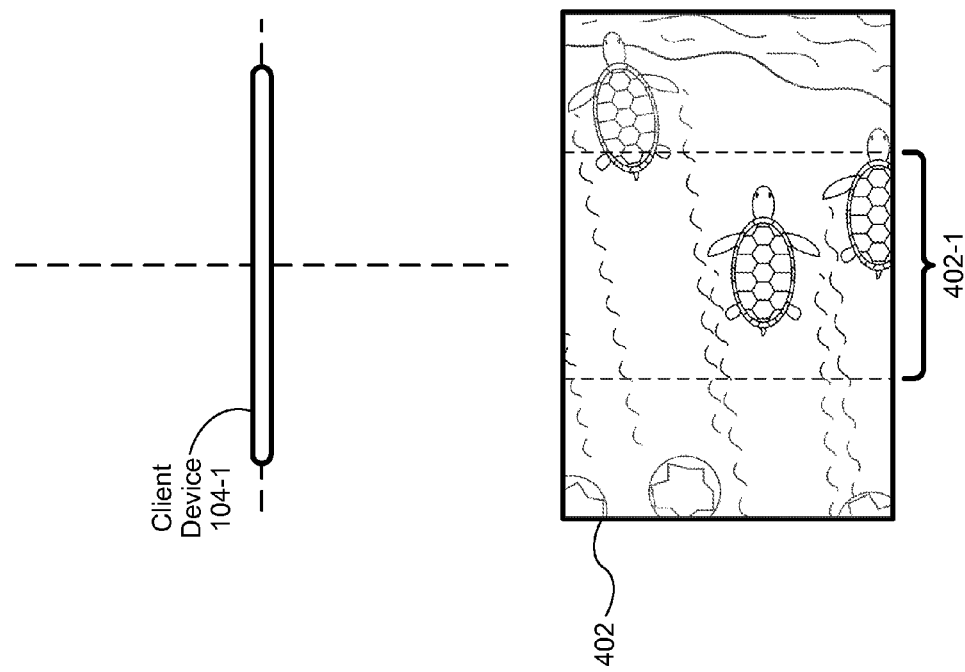
Figure 4D:
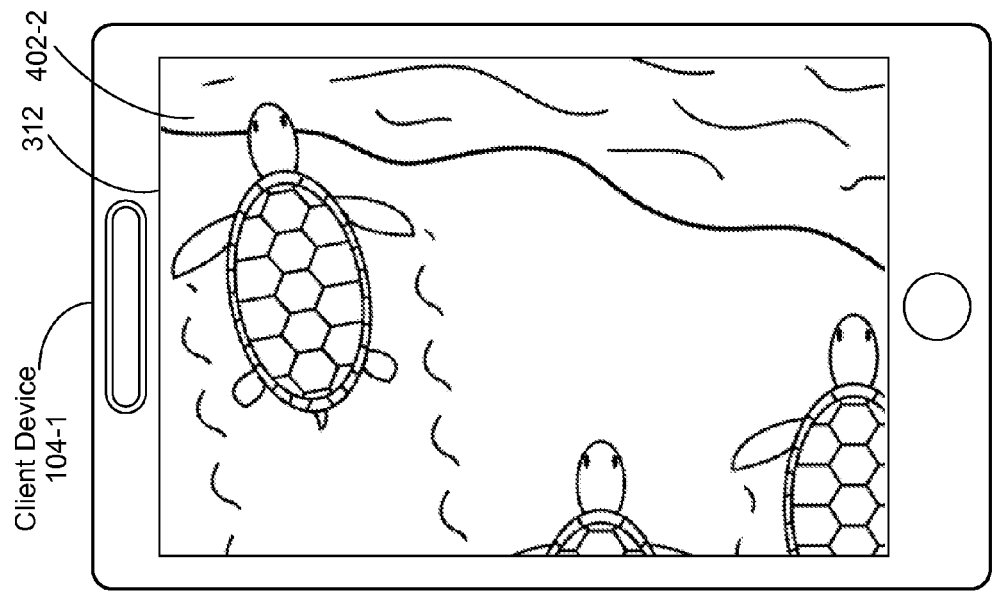
Figure 4D:
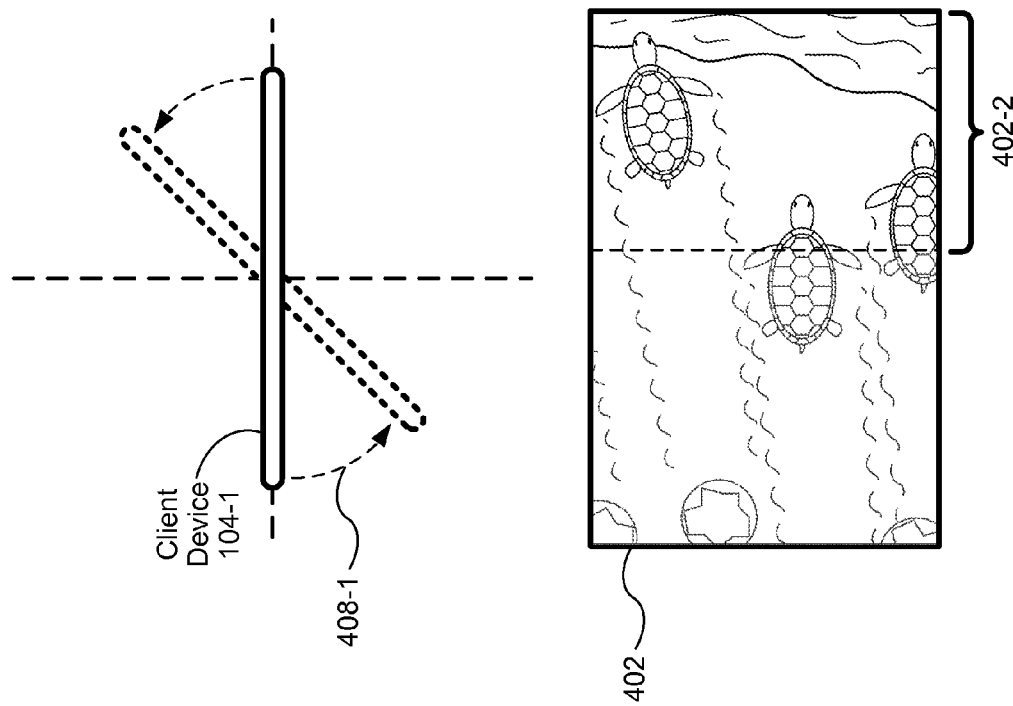
Figure 4E:
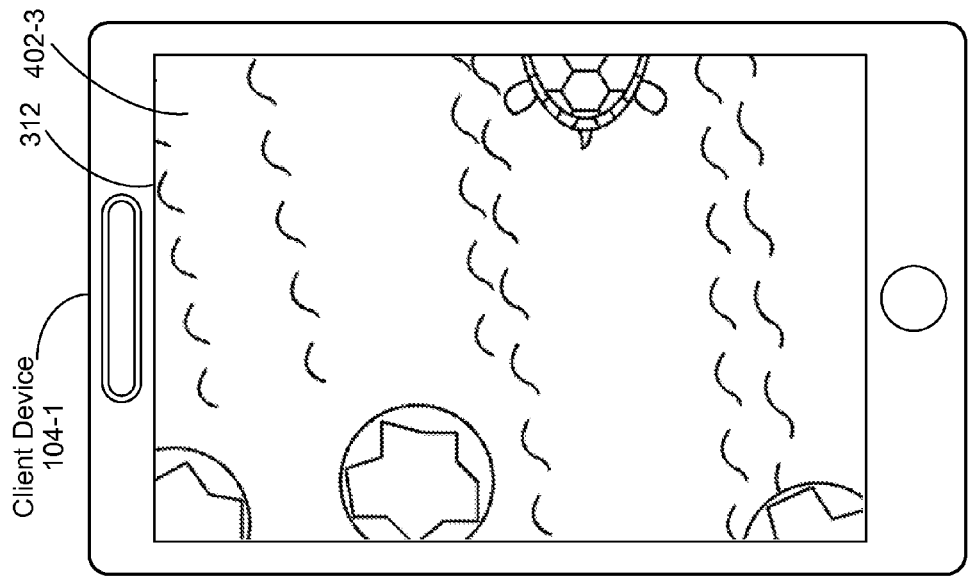
Figure 4E:
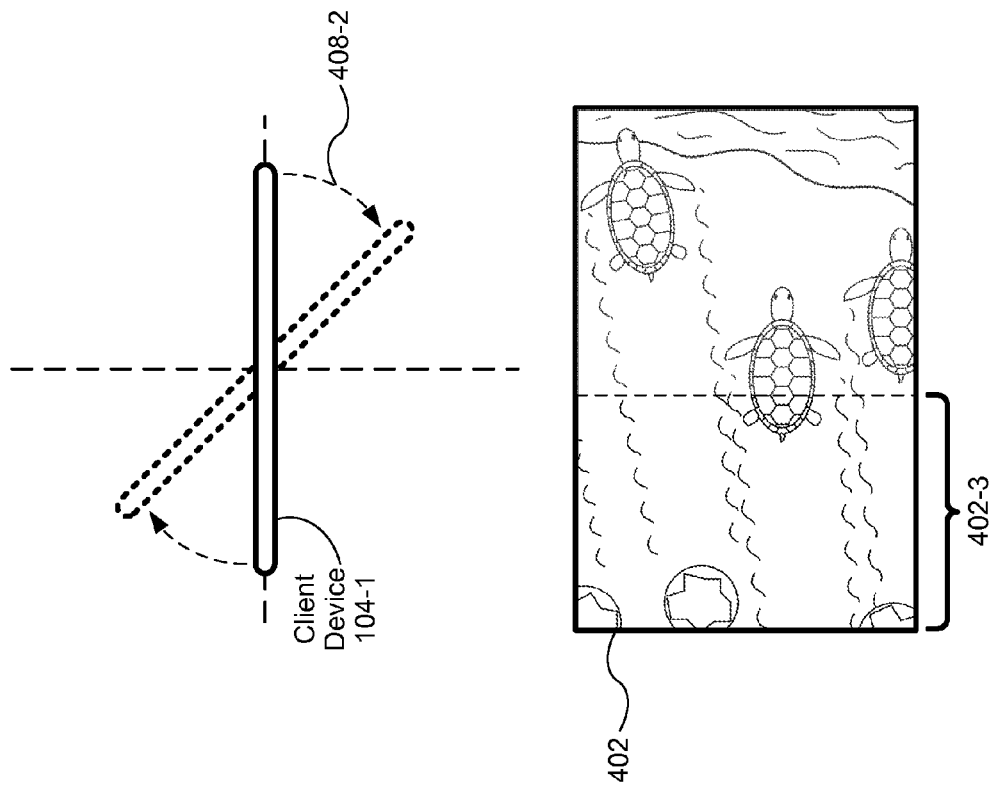
Figure 5A:
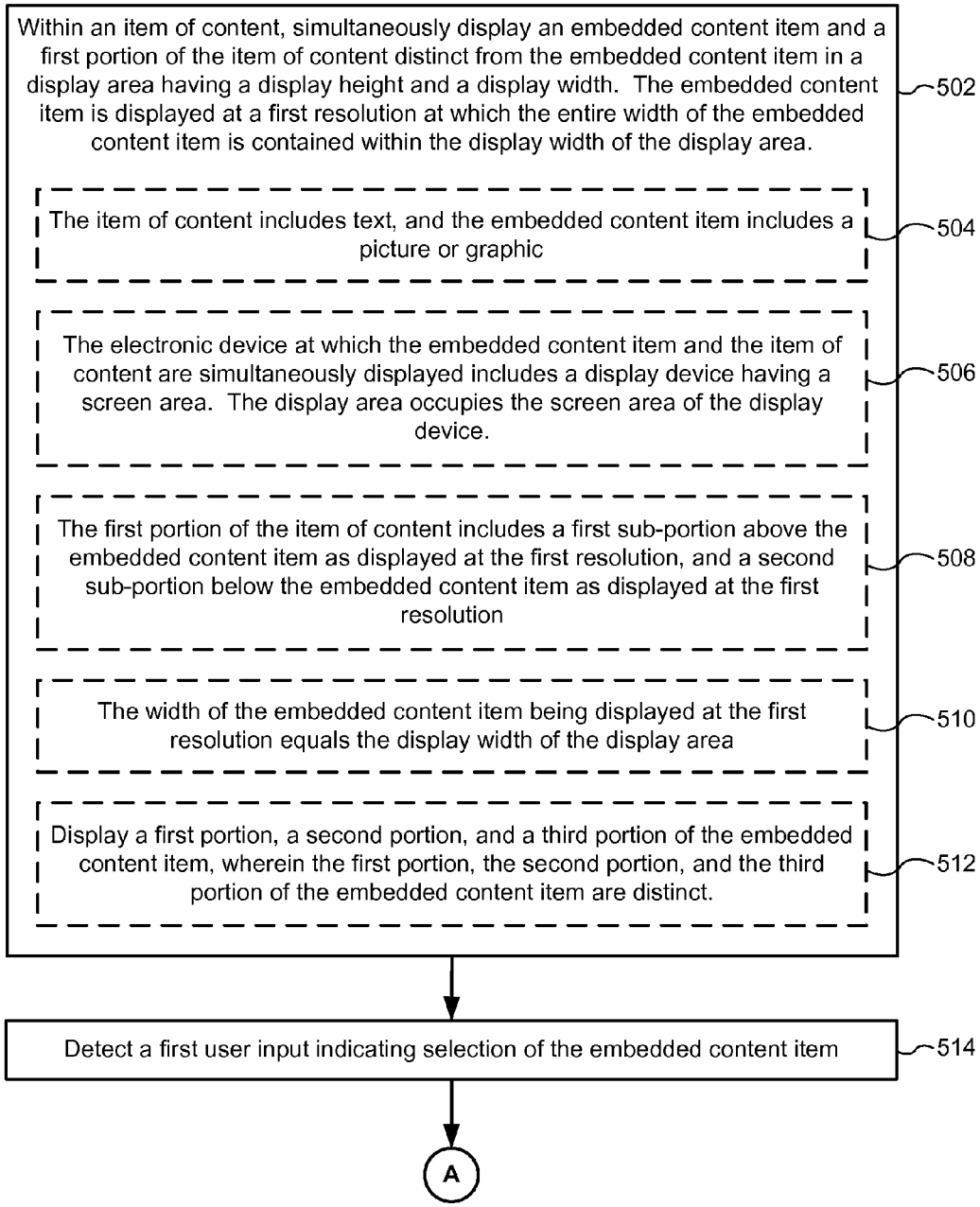
FIGS. 5A-5C are flow diagrams illustrating a method of viewing embedded content, in accordance with some embodiments.
Figure 5B:
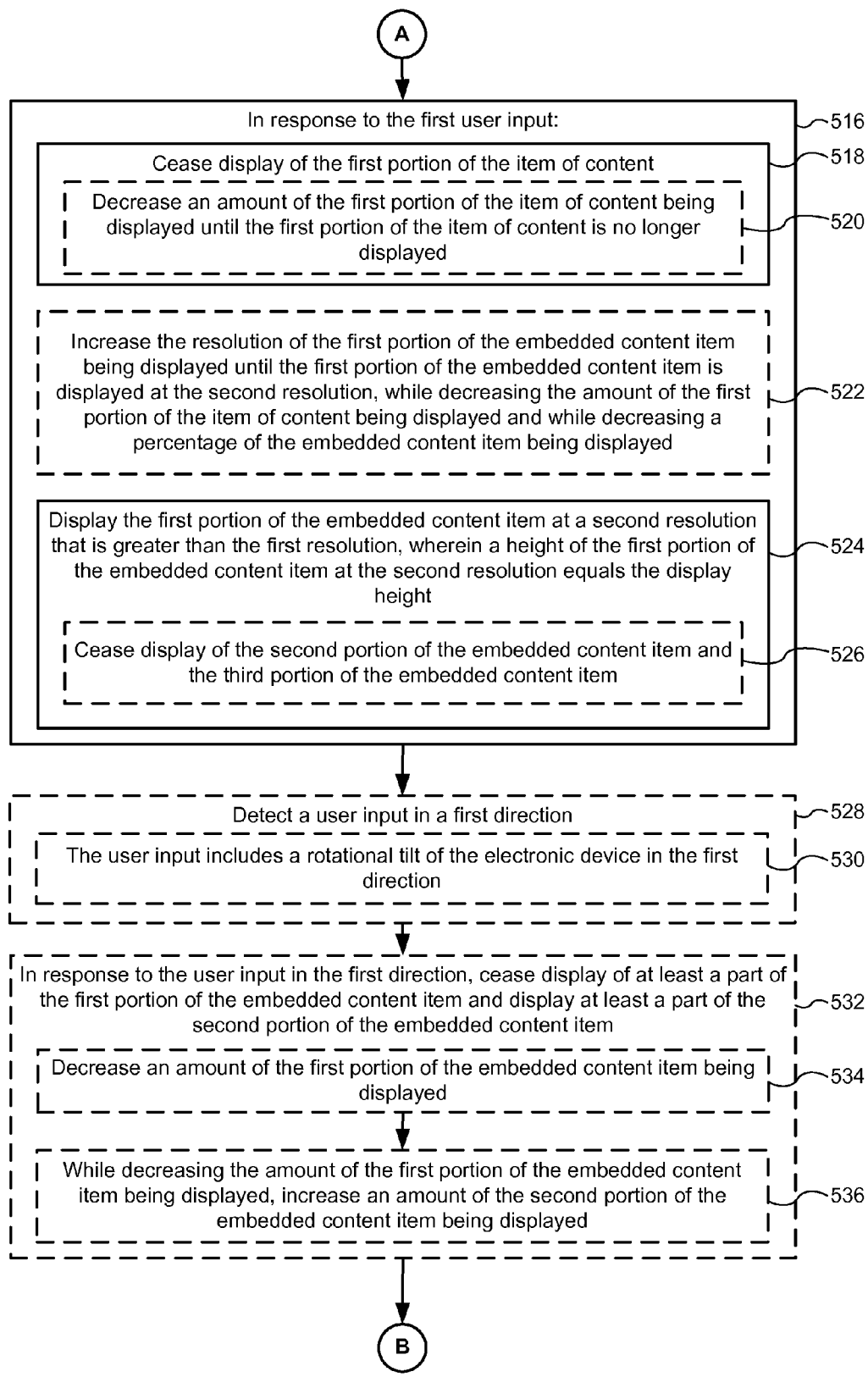
Figure 5C:
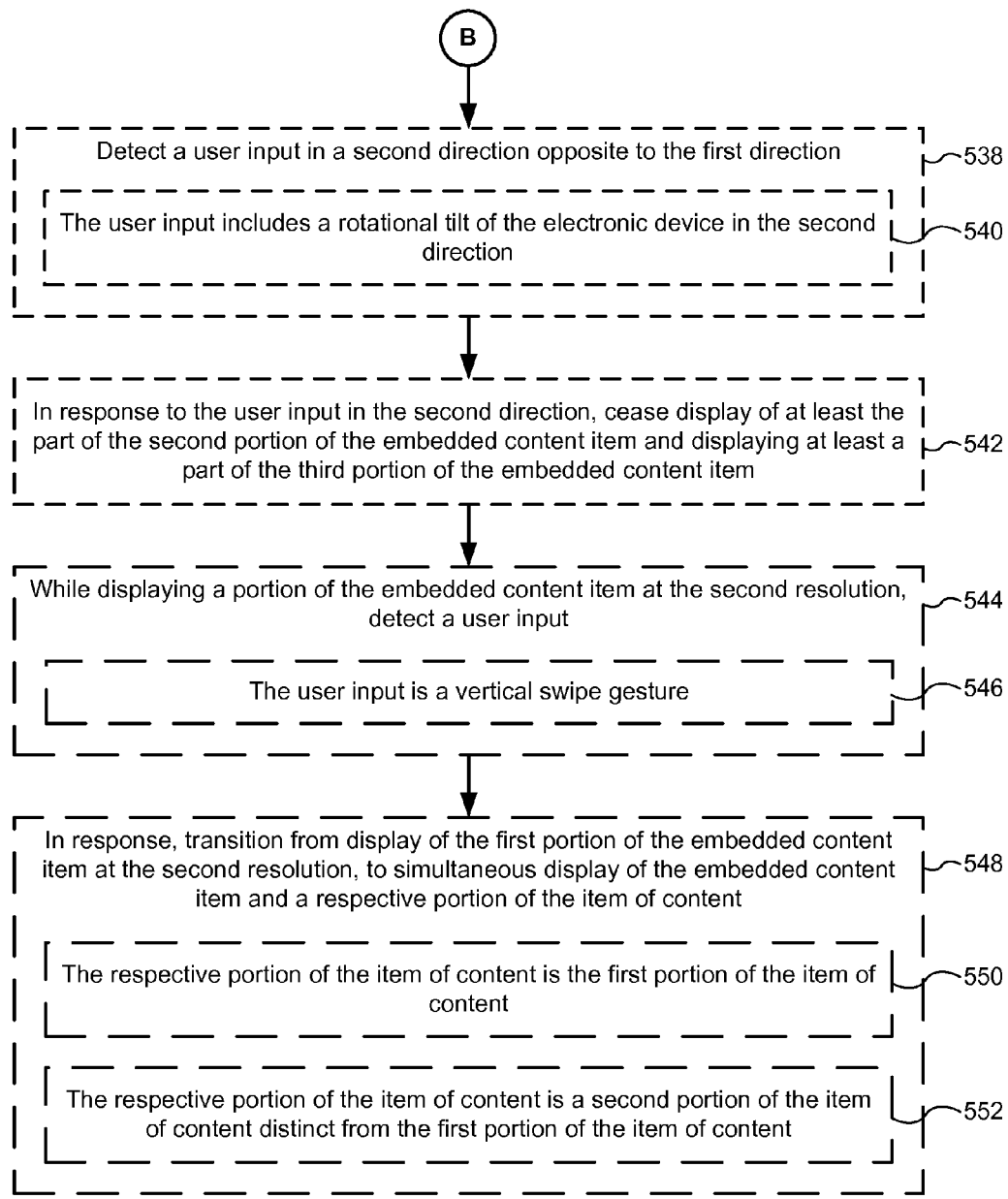

In FIG. 4B, detecting a gesture 406 (e.g., a tap) on the embedded content item 402 results in displaying the embedded content item at a larger resolution (FIG. 4C) than the resolution at which the embedded content item is displayed in FIG. 4B. Only a portion 402-1 of the embedded content item is shown in FIG. 4C, because the entire embedded content item 402 does not fit with the display area at the larger resolution. While displaying the embedded content item 402 at the larger resolution, detecting tilt gesture 408-1 (shown in FIG. 4D for a cross-sectional view of the client device 104-1) results in displaying a different portion 402-2 of the embedded content item, while detecting tilt gesture 408-2 (FIG. 4E) results in displaying yet another portion 402-3 of the embedded content item.

Figure 4G:
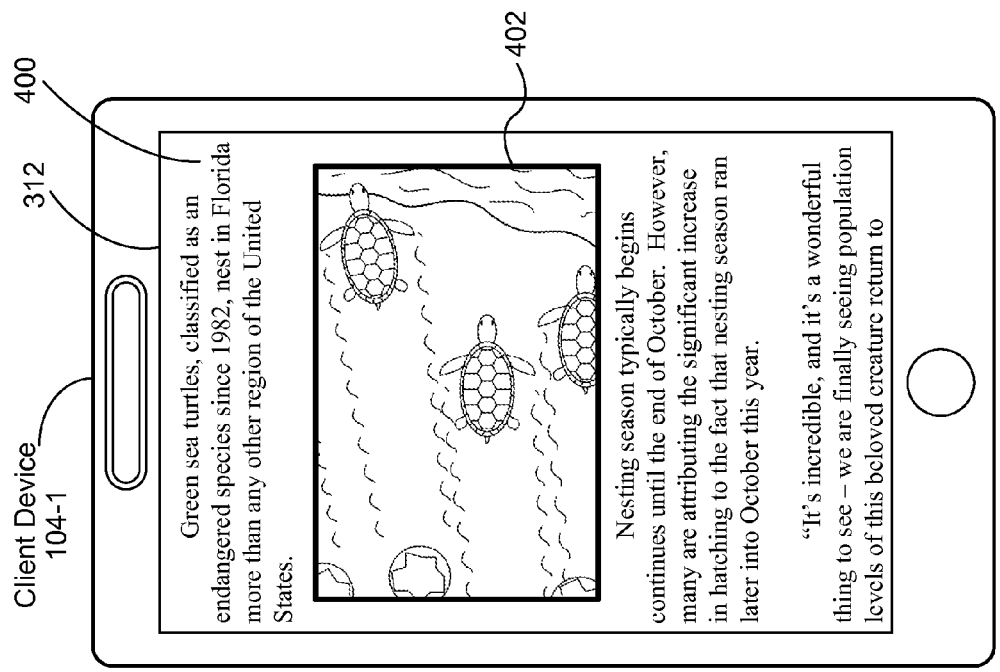
Figure 4F:
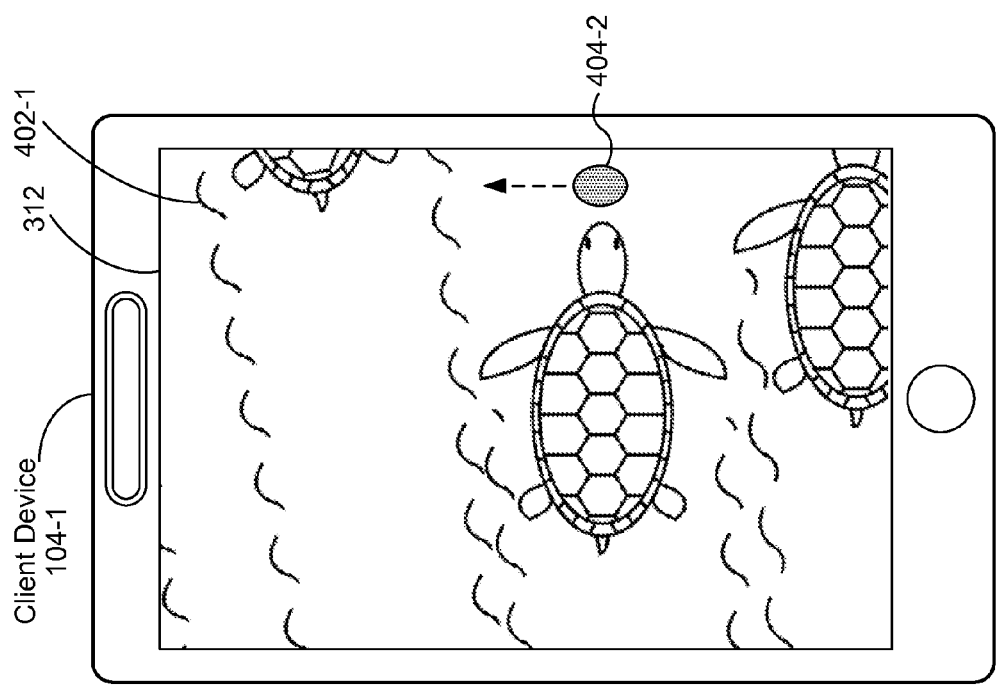

In FIG. 4F, detecting a swipe gesture 404-2 (while displaying the embedded content item 402 at the larger resolution) reverts back to displaying the embedded content item 402 at the initial resolution (FIG. 4B), as shown in FIG. 4G.

The GUIs shown in FIGS. 4A-4G are described in greater detail below in conjunction with the method 500 of FIGS. 5A-5C.

FIGS. 5A-5C are flow diagrams illustrating the method 500 of viewing embedded content, in accordance with some embodiments. The method 500 is performed on an electronic device (e.g., client device 104, FIGS. 1 and 3). FIGS. 5A-5C correspond to instructions stored in a computer memory (e.g., memory 306 of the client device 104, FIG. 3) or other computer-readable storage medium. To assist with describing the method 500, FIGS. 5A-5C will be described with reference to the exemplary GUIs illustrated in FIGS. 4A-4G.

In the method 500, the electronic device simultaneously displays (502), within an item of content, an embedded content item and a first portion of the item of content distinct from the embedded content item. The embedded content item and a first portion are displayed together in a display area having a display height and a display width. The embedded content item is displayed at a first resolution at which the entire width of the embedded content item is contained within the display width of the display area. As shown in the example of FIG. 4A, the embedded content item 402 is displayed at a resolution at which the entire width of the embedded content item 402 is contained within the display width. In some embodiments, the embedded content item is displayed at a resolution at which the entire height of the embedded content item is contained within the display height of the display area (e.g., the embedded content item 402 as shown in FIG. 4B).

As described above, items of content include various types of formatted content, which may include different types of embedded content items presentable to a user and with which a user may interact. In some embodiments, the item of content includes (504) text, and the embedded content item includes a picture or graphic. In FIG. 4A, for example, the item of content 400 is a news article, a portion of which is simultaneously displayed with the embedded content item 402, which is an associated picture. Other examples of items of content include but are not limited to web pages, blogs, user content published via a social-networking service, and/or other types of published content. Other examples of embedded content items include text, other types of digital media (e.g., videos), and/or other electronic content with which a user may interact (e.g., interactive maps, games, etc.).

In some embodiments, the electronic device includes (506) a display device (e.g., display 312, FIGS. 3 and 4A) having a screen area. The display area occupies (i.e., is coextensive with) the screen area of the display device. Referring to FIG. 4B, for example, a portion of the item of content 400 and the embedded content item 402 are simultaneously displayed in a display area, where the display area occupies the screen area of the display 312. In some embodiments, the display area occupies less than the screen area of the display device (e.g., the GUI displaying the item of content and embedded content item is a window or tile that occupies only a fraction of the screen area).

In some embodiments, the first portion of the item of content includes (508) a first sub-portion above the embedded content item as displayed at the first resolution, and a second sub-portion below the embedded content item as displayed at the first resolution (e.g., FIG. 4B, where sub-portions of the item of content 400 are shown above and below the embedded content item 402).

In some embodiments, the width of the embedded content item being displayed at the first resolution equals (510) the display width of the display area (e.g., equals the screen width, window width, or tile width). In some embodiments, the width of the embedded content item being displayed at the first resolution is less than the display width (e.g., embedded content item 402 as shown in FIG. 4B).

In some embodiments, simultaneously displaying (502) the embedded content item and the first portion of the item of content includes (512) displaying a first portion, a second portion, and a third portion of the embedded content item, wherein the first portion, the second portion, and the third portion of the embedded content item are distinct (e.g., and together compose the entire embedded content item). Displaying the embedded content item 402 in FIG. 4B, for example, may be viewed as displaying three distinct portions of the embedded content item 402: a first portion 402-1 (FIG. 4C), a second portion 402-2 (FIG. 4D), and a third portion (FIG. 4E). The first, second, and third portions of the embedded content item may be partially distinct (i.e., some portions overlap with other portions, such as portions 402-1 through 402-3, FIG. 4E) or entirely distinct (i.e., no two portions overlap).

A first user input indicating selection of the embedded content item is detected (514). In some embodiments, the first user input is a touch gesture (e.g., tap) detected on the embedded content item (e.g., gesture 406, FIG. 4B).

Referring now to FIG. 5B, in response to detecting (516) the first user input, the electronic device ceases (518) display of the first portion of the item of content, and displays (524) the first portion of the embedded content item at a second resolution that is greater than the first resolution. In some embodiments, the height of the first portion of the embedded content item at the second resolution equals the display height. An example is shown in FIGS. 4B and 4C, where the gesture 406 is detected on the embedded content item 402 (FIG. 4B). In response, the client device 104-1 ceases display of the item of content 400, and a first portion of the embedded content item 402-1 is displayed (FIG. 4C) at a larger resolution than the displayed embedded content item 402 (FIG. 4B), such that the embedded content item is effectively shown in a zoomed view.

In some embodiments, ceasing (518) display of the first portion of the item of content includes (520) decreasing an amount of the first portion of the item of content being displayed until the first portion of the item of content is no longer displayed. Decreasing the amount of the first portion of the item of content being displayed may include displaying various visual effects. For example, when transitioning from the GUI of FIG. 4B to the GUI of FIG. 4C in response to detecting the first user input, the displayed portions of the item of content 400 (FIG. 4B) outside of the embedded content item may appear as if they are being gradually shrunk while the resolution of the embedded content item 402 proportionally increases. Alternatively, the displayed portions may appear as if being visually pushed off the visible boundaries of the display area (i.e., off the edges of the display 312). In yet another embodiment, the displayed portions appear stationary, as the displayed embedded content item 402 visually expands to the second resolution and "covers" the displayed portions (i.e., the displayed portions are effectively "beneath" or "behind" the embedded content item 402).

In some embodiments, before displaying (524) the first portion of the embedded content item at the second resolution, the resolution of the first portion of the embedded content item being displayed is increased (522) until the first portion of the embedded content item is displayed at the second resolution. The resolution of the first portion of the embedded content item is increased while decreasing the amount of the first portion of the item of content being displayed, and while decreasing a percentage of the embedded content item being displayed. For example, the first portion of the embedded content item 402-1 displayed in FIG. 4C represents a smaller percentage of the embedded content item 402 than the entire embedded content item 402 displayed in FIG. 4B.

In some embodiments, displaying (524) the first portion of the embedded content item at the second resolution includes (526) ceasing display of the second portion of the embedded content item and the third portion of the embedded content item. For example, in FIG. 4C, when displaying the first portion of the embedded content item 402-1, the adjacent portions (a second portion to the left and a third portion to the right of the first portion 402-1, as illustrated in FIG. 4C) are no longer displayed.

In some embodiments, a user input is detected (528) in a first direction. For example, the user input includes a rotational tilt (530) of the electronic device in the first direction. The rotational tilt may include a turning of the electronic device in a direction (e.g., clockwise or counter-clockwise) with respect to an axis (e.g., an axis that bisects the display) (e.g., axes of a horizontal plane). For example, FIGS. 4C-4E illustrate views of the client device 104-1 from the bottom of the device seen at eye level (i.e., cross-sectional views). With reference to the orientation of the client device 104-1 in FIG. 4C (no tilt, parallel to horizontal plane), the tilt gesture 408-1 (FIG. 4D) is a rotational tilt in a counter-clockwise direction.

In response to detecting (528) the user input in the first direction, the electronic devices ceases (532) display of at least a part of the first portion of the embedded content item and displays at least a part of the second portion of the embedded content item. FIGS. 4C and 4D illustrate an example. In response to detecting the tilt gesture 408-1 (FIG. 4D), the client device 104-1 transitions from displaying the first portion of the embedded content item 402-1 (FIG. 4C) to displaying the second portion of the embedded content item 402-2 (FIG. 4D). As shown in FIG. 4D, the second portion of the embedded content item 402-2 includes part of the first portion 402-1 (shown in FIG. 4C), while the remaining part of the first portion 402-1 is no longer displayed. The user input in the first direction (e.g., tilt gesture 408-1, FIG. 4D) therefore allows a user to manipulate and interact with a displayed view of the embedded content item. In this example, the user is able to view portions of a picture that are not within the display area in operation 524 (i.e., portions that are no longer visible after enlarging the resolution of the embedded content item 400).

In some embodiments, ceasing (532) display of at least a part of the first portion of the embedded content item and displaying at least a part of the second portion of the embedded content item includes (534) decreasing an amount of the first portion of the embedded content item being displayed. Furthermore, while decreasing (534) the amount of the first portion of the embedded content item being displayed, an amount of the second portion of the embedded content item being displayed is increased (536). For example, in response to detecting the tilt gesture 408-1 in FIG. 4D (i.e., transitioning from the GUI of FIG. 4C to 4D), the amount of the first portion of the embedded content item 402-1 being displayed is decreased, while the amount of the second portion of the embedded content item 402-1 being displayed is increased. Translation within the embedded content item from the first portion to the second portion thus is achieved in accordance with some embodiments.

Referring now to FIG. 5C, in some embodiments, a user input is detected (538) in a second direction opposite to the first direction (in 528). In some embodiments, the user input includes (540) a rotational tilt of the electronic device in the second direction. For example, a tilt gesture 408-2 is detected in FIG. 4E, which is a rotational tilt in a clockwise direction (opposite to the direction of the tilt gesture 408-1, FIG. 4D). In response to detecting (538) the user input in the second direction, the electronic devices ceases (542) display of at least the part of the second portion of the embedded content item and displays at least a part of the third portion of the embedded content item. (If operations 528 and 532 are omitted from the method 500, then display of at least part of the first portion of the embedded content item ceases and at least a part of the third portion of the embedded content item is displayed.) In FIG. 4E, for example, in response to detecting a tilt gesture 408-2, the client device 104-1 transitions from displaying the second portion of the embedded content item 402-2 (FIG. 4D) to displaying the third portion of the embedded content item 402-3 (FIG. 4E). In the example of FIG. 4E, the third portion of the embedded content item 402-3 includes part of the first portion 402-1 (shown in FIG. 4C). Alternatively, the first and third portions do not overlap. Thus, in some embodiments, the part of the first portion of the embedded content item that is no longer displayed while displaying the second portion of the embedded content item is displayed while displaying the third portion of the embedded content item.

In some embodiments, the height of the embedded content item at the second resolution would exceed the display height of the display area. Thus, in some embodiments, the electronic device ceases displaying portions above and/or below the first portion (e.g., top and/or bottom portions of the embedded content item), along with a second portion (e.g., adjacent and to the left of the first portion) and a third portion (e.g., adjacent and to the right of the first portion) of the embedded content item. In these embodiments, in response to detecting a user input in a first direction (e.g., clockwise), at least part of the second portion of the embedded content item is displayed, and in response to detecting a user input in a second direction opposite to the first direction (e.g., counter-clockwise), at least part of the third portion of the embedded content item is displayed. In some embodiments, in response to detecting a user input in a third direction distinct from the first and second direction (e.g., substantially perpendicular to the first and second directions), the electronic device displays at least some of the top or bottom portion that ceased being displayed. Continuing the example above, if a tilt gesture is detected with respect to an axis distinct from (e.g., substantially perpendicular to) the first and second directions (e.g., with reference to the display as viewed by a user holding a device, a side-to-side axis, rather than a top-to-bottom axis), a top or bottom portion of the embedded content item is displayed.

In some embodiments, the amount of a respective portion of the embedded content item being displayed in response to detecting a user input (e.g., a rotational tilt) is proportional to the magnitude of the user input. The magnitude of a rotational tilt, for example, corresponds to the angle of the rotational tilt with respect to a predefined axis (e.g., longitudinal/latitudinal axes of a planar surface of the client device 104-1, such as axes that bisect the display). As an example, referring to FIG. 4D, the amount of the second portion 402-2 displayed in response to detecting the tilt gesture 408-1 that forms a first angle (e.g., a 15 degree angle) with the horizontal axis, is less than an amount of the second portion 402-2 that would displayed in response to detecting a tilt gesture in the same direction that forms a second, larger angle (e.g., a 45 degree angle).

In some embodiments, the direction of the rotational tilt is with reference to one or more axes of a predefined plane (e.g., the plane of the display at the time the first user input is detected, but not substantially perpendicular to a plane defined by the direction of gravity). Axes based on a predefined plane may therefore allow a user to more naturally view or interact with embedded content without requiring the user to adjust his viewing angle or orient the client device to conform to arbitrarily defined axes.

In some embodiments, while displaying a portion of the embedded content item at the second resolution, a user input is detected (544). In some embodiments, the user input is (546) a swipe gesture (e.g., a substantially vertical swipe). Additionally and/or alternatively, the user input may be a tap gesture (e.g., single tap). In response to detecting (544) the user input, the electronic device transitions (548) from display of the first portion of the embedded content item at the second resolution, to simultaneous display of the embedded content item and a respective portion of the item of content. For example, a swipe gesture 404-2 (FIG. 4F) in a substantially vertical direction is detected while displaying the first portion of the embedded content item 402-1. In response, the entire embedded content item 402 and a portion of the item of content 400 are simultaneously displayed.

In some embodiments, the respective portion of the item of content (548) is the first portion of the item of content (550). In other words, the electronic device reverts back to displaying the portion of the item of content at the resolution displayed prior to displaying the embedded content item at the second resolution. In other embodiments, the respective portion of the item of content (548) is a second portion of the item of content (552) distinct from the first portion of the item of content (e.g., more text is displayed below the embedded content item 402 in FIG. 4G than in FIG. 4B). In another example, in response to the swipe gesture 404-2 (FIG. 4F), the electronic device may smoothly transition back to displaying the embedded content item 402 at the prior resolution (i.e., gradually decrease the displayed resolution of the embedded content item 402 from the second resolution to the first resolution). Until the displayed embedded content item 402 returns to the first resolution, the portion of the item of content 400 being displayed is therefore different from the first portion displayed in FIG. 4B.

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
    at an electronic device having one or more processors and memory storing instructions for execution by the one or more processors:
        within an item of content, simultaneously displaying an embedded content item and a first portion of the item of content distinct from the embedded content item in a display area having a display height and a display width, the embedded content item being displayed at a first resolution at which the entire width of the embedded content item is contained within the display width of the display area and the first portion is displayed above the embedded content item;
        detecting a touch gesture indicating selection of the embedded content item;
        in response to the touch gesture:
            ceasing display of the first portion of the item of content; and
            displaying a first portion of the embedded content item at a second resolution that is greater than the first resolution, wherein a height of the first portion of the embedded content item at the second resolution equals the display height;
        while displaying the first portion of the embedded content item at the second resolution, detecting a swipe gesture in a first direction; and
        in response to the swipe gesture in the first direction, transitioning from display of the first portion of the embedded content item at the second resolution, to simultaneous display of the embedded content item at the first resolution and a second portion of the item of content within the item of content, wherein:
            the second portion of the item of content is distinct from the first portion of the item of content;
            the second portion of the item of content is not displayed while simultaneously displaying the embedded content item and the first portion of the item of content; and
            the first portion of the item of content is not displayed while simultaneously displaying the embedded content item and the second portion of the item of content.

2. The method of claim 1, wherein the swipe gesture is a substantially vertical swipe gesture.

3. The method of claim 1, wherein the first portion of the item of content comprises a first sub-portion above the embedded content item as displayed at the first resolution, and a second sub-portion below the embedded content item as displayed at the first resolution.

4. The method of claim 1, wherein:
    the electronic device comprises a display device having a screen area; and
    the display area occupies the screen area of the display device.

5. The method of claim 1, wherein:
    the item of content includes text; and
    the embedded content item includes a picture or graphic.

6. The method of claim 1, wherein the width of the embedded content item being displayed at the first resolution equals the display width of the display area.

7. The method of claim 1, wherein:
    ceasing display of the first portion of the item of content comprises decreasing an amount of the first portion of the item of content being displayed until the first portion of the item of content is no longer displayed; and
    the method further comprises, in response to the touch gesture and before displaying the first portion of the embedded content item at the second resolution, increasing the resolution of the first portion of the embedded content item being displayed until the first portion of the embedded content item is displayed at the second resolution, while decreasing the amount of the first portion of the item of content being displayed and while decreasing a percentage of the embedded content item being displayed.

8. The method of claim 1, wherein:
    simultaneously displaying the embedded content item and the first portion of the item of content comprises displaying the first portion, a second portion, and a third portion of the embedded content item, wherein the first portion, the second portion, and the third portion of the embedded content item are distinct; and
    displaying the first portion of the embedded content item at the second resolution comprises ceasing display of the second portion of the embedded content item and the third portion of the embedded content item.

9. The method of claim 8, further comprising, at the electronic device, while displaying the first portion of the embedded content item at the second resolution and before detecting the swipe gesture:

detecting a tilt gesture in a first direction; and
in response to the tilt gesture, ceasing display of at least a part of the first portion of the embedded content item and displaying at least a part of the second portion of the embedded content item.

10. The method of claim 9, further comprising, at the electronic device:
after detecting the tilt gesture, detecting another tilt gesture in a second direction opposite to the first direction; and
in response to the other tilt gesture, ceasing display of at least the part of the second portion of the embedded content item and displaying at least a part of the third portion of the embedded content item.

11. The method of claim 9, wherein ceasing display of at least the part of the first portion of the embedded content item and displaying at least the part of the second portion of the embedded content item comprises:
decreasing an amount of the first portion of the embedded content item being displayed, and
while decreasing the amount of the first portion of the embedded content item being displayed, increasing an amount of the second portion of the embedded content item being displayed.

12. An electronic device, comprising:
one or more hardware processors; and
memory storing one or more programs for execution by the one or more hardware processors, the one or more programs including instructions for:
within an item of content, simultaneously displaying an embedded content item and a first portion of the item of content distinct from the embedded content item in a display area having a display height and a display width, the embedded content item being displayed at a first resolution wherein the entire width of the embedded content item is contained within the display width of the display area and the first portion is displayed above the embedded content item;
detecting a touch gesture indicating selection of the embedded content item;
in response to the touch gesture:
ceasing display of the first portion of the item of content; and
displaying a first portion of the embedded content item at a second resolution that is greater than the first resolution, wherein a height of the first portion of the embedded content item at the second resolution equals the display height;
while displaying the first portion of the embedded content item at the second resolution, detecting a swipe gesture in a first direction; and
in response to the swipe gesture in the first direction, transitioning from display of the first portion of the embedded content item at the second resolution, to simultaneous display of the embedded content item at the first resolution and a second portion of the item of content within the item of content, wherein:
the second portion of the item of content is distinct from the first portion of the item of content;
the second portion of the item of content is not displayed while simultaneously displaying the embedded content item and the first portion of the item of content; and
the first portion of the item of content is not displayed while simultaneously displaying the embedded content item and the second portion of the item of content.

13. A non-transitory computer-readable storage medium storing one or more programs for execution by one or more hardware processors of an electronic device, the one or more programs including instructions for:
within an item of content, simultaneously displaying an embedded content item and a first portion of the item of content distinct from the embedded content item in a display area having a display height and a display width, the embedded content item being displayed at a first resolution wherein the entire width of the embedded content item is contained within the display width of the display area and the first portion is displayed above the embedded content item;
detecting a touch gesture indicating selection of the embedded content item;
in response to the touch gesture:
ceasing display of the first portion of the item of content; and
displaying a first portion of the embedded content item at a second resolution that is greater than the first resolution, wherein a height of the first portion of the embedded content item at the second resolution equals the display height;
while displaying the first portion of the embedded content item at the second resolution, detecting a swipe gesture in a first direction; and
in response to the swipe gesture in the first direction, transitioning from display of the first portion of the embedded content item at the second resolution, to simultaneous display of the embedded content item at the first resolution and a second portion of the item of content within the item of content, wherein:
the second portion of the item of content is distinct from the first portion of the item of content;
the second portion of the item of content is not displayed while simultaneously displaying the embedded content item and the first portion of the item of content; and
the first portion of the item of content is not displayed while simultaneously displaying the embedded content item and the second portion of the item of content.

* * * * *

UNITED STATES PATENT AND TRADEMARK OFFICE
CERTIFICATE OF CORRECTION

PATENT NO. : 10,042,532 B2  
APPLICATION NO. : 14/704472  
DATED : August 7, 2018  
INVENTOR(S) : Matas et al.

Page 1 of 1

It is certified that error appears in the above-identified patent and that said Letters Patent is hereby corrected as shown below:

On the Title Page (54), please delete "METHODS AND SYSTEMS FOR VIEWING EMBEDDED CONTENT" and insert --METHODS AND SYSTEMS FOR VIEWING PORTIONS OF AN ITEM OF CONTENT AND AN EMBEDDED CONTENT ITEM AT DIFFERENT RESOLUTIONS IN RESPONSE TO TOUCH GESTURES--.

Signed and Sealed this  
Sixth Day of November, 2018

Andrei Iancu  
*Director of the United States Patent and Trademark Office*